US005536315A

United States Patent [19]

Guzowski et al.

[11] Patent Number: 5,536,315

[45] Date of Patent: Jul. 16, 1996

[54] METHOD AND SYSTEM FOR SPRAYING MATERIAL IN A SPRAY PATTERN HAVING A VARIABLE FORM AND COLLECTING EXCESS MATERIAL

[75] Inventors: Raymond J. Guzowski, Fenton; David W. Lazar, Troy, both of Mich.

[73] Assignee: FANUC Robotics North America, Inc., Auburn Hills, Mich.

[21] Appl. No.: 270,007

[22] Filed: Jul. 1, 1994

[51] Int. Cl.[6] .............................. B05B 15/04; B05C 5/00

[52] U.S. Cl. .......................... 118/301; 118/326; 118/504; 118/694; 239/103; 239/124

[58] Field of Search ............................ 118/693–694, 323, 118/326, 300, 301, 504, 406; 239/124, 150, 103; 222/64

[56] References Cited

U.S. PATENT DOCUMENTS

| | | | |
|---|---|---|---|
| 1,675,002 | 6/1928 | Steiner | 239/103 X |
| 1,803,967 | 5/1931 | Good . | |
| 1,828,463 | 10/1931 | Hammers . | |
| 2,374,290 | 4/1945 | Johansson | 239/103 |
| 2,733,172 | 1/1956 | Brennan | 427/424 |
| 3,141,793 | 7/1964 | Oliphant | 239/124 X |
| 3,583,634 | 6/1968 | Sheetz | 239/103 |
| 4,269,874 | 5/1981 | Pryor et al. | 118/301 X |
| 4,820,900 | 4/1989 | Höhle et al. | 118/326 X |
| 4,857,367 | 8/1989 | Thorn et al. | 239/124 X |
| 4,974,532 | 12/1990 | March | 118/301 |
| 5,098,024 | 3/1992 | MacIntyre et al. | 239/587.1 |
| 5,175,018 | 12/1992 | Lee et al. | 427/8 |
| 5,211,339 | 5/1993 | Zeiler | 239/124 X |

*Primary Examiner*—Robert J. Warden
*Assistant Examiner*—Krisanne M. Thornton
*Attorney, Agent, or Firm*—Howard & Howard

[57] ABSTRACT

A variable form spray system includes a robot manipulator, a masking tool assembly integrated with the manipulator, sealer supply hardware which supplies spray material to the manipulator and sealer recovery hardware which recovers material sprayed and skived by the masking tool assembly. Spray pattern form is controlled by collecting overspray using adjustable skive manifolds of the assembly on each side of the spray pattern which function to vacuum off the edges of the airless spray pattern. The positions of the skive manifolds are programmable.

18 Claims, 5 Drawing Sheets

59
86
82
88
COMPRESSED AIR SUPPLY
64
63
66
84
60
80
76
74
72
62
78 79
78
70
14
SAFETY CLUTCH
23

METHOD AND SYSTEM FOR SPRAYING MATERIAL IN A SPRAY PATTERN HAVING A VARIABLE FORM AND COLLECTING EXCESS MATERIAL

TECHNICAL FIELD

This invention relates to methods and systems for spraying material and, inparticular, to methods and systems for spraying material in a spray pattern having a variable form and collecting excess material

BACKGROUND ART

The application of vinyl lower body coating (stonechip) material and underbody materials in the automotive paint process to provide a well defined edge require precise location of the material being applied.

Overspray of material traditionally has been controlled by using masking materials, or masking devices to insure application of material in the proper locations. Masking materials include masking tape, paper, and Styrofoam plugs. Masking devices also include rotating disks, belts, and stationary shields.

The airless spray process inherently has variables that make repeatable application of spray coatings difficult from job-to-job. The application of masking materials to contain the application is expensive due to both labor and material costs. Mechanical masking is also expensive in both capital investment and maintenance costs to support production.

Some prior art systems use a rotary mask device to mask the body side. For example, the U.S. Pat. No. to March, 4,974,532, discloses a self-cleaning mask arrangement for use on a robot. Excess material sprayed by an airless spray tip is collected on a rotating disk and scraped into a recovery cup for reuse. In another example, the U.S. Pat. No. to Lee et al. (5,175,018) discloses a robotic masking system used when spraying PVC stonechip material. In one embodiment, this system sprays air at the object to be coated, thereby forming an air masking curtain. A recovery system is also discussed.

The U.S. Pat. No. to Pryor et al. (4,269,874) shows a vacuum for sucking excess spray off of a mask.

The U.S. Pat. Nos. to Good (1,803,967), Hammers (1,828,463) and Sheetz (3,583,634) each disclose spray nozzles of various designs including both spray pattern restrictors and material recovery systems.

The U.S. Pat. No. to MacIntyre et al. (5,098,024) shows a robot with an arm supporting a spray gun for programmable spraying within cavities.

The prior art generally has the following shortcomings:

1. The masking device is very cumbersome and can only be used in limited orientations.
2. The material recovery cup relies on gravity for collecting excess material.
3. The masking device can only mask one side of the airless spray pattern limiting the precision of the mask due to viscosity, tip, and pressure variations.
4. The masking does not have the capability to change the mask location relative to the spray pattern. This results in fixed spray width on one side of the spray application.

SUMMARY OF THE INVENTION

An object of the present invention is to solve many of the problems of the prior art by providing a method and system for spraying material wherein a variable spray pattern form is precisely controlled using a simple masking tool assembly mounted together with a spray applicator on a robot for the application of a coating material such as stonechip and underbody coatings.

Another object of the present invention is to provide a method and system for spraying material in a spray pattern having a variable form wherein the system has reduced cost and complexity, combined with a more simple and flexible process or method.

In carrying out the above objects and other objects of the present invention, a method is provided for spraying material in a spray pattern having a variable form. The method includes the steps of providing material supply apparatus for supplying the material, spraying the material along a spray path in the spray pattern, providing masking means for obstructing the spray path of the material, and generating a first set of control signals representing a desired width of the spray pattern. The method also includes the step of moving the masking means in response to the first set of control signals to obstruct the spray path of the material adjacent an edge of the spray pattern to vary the form of the spray pattern.

Still further in carrying out the above objects and other objects of the present invention, a system is provided for spraying material in a spray pattern having a variable form and collecting excess material. The system includes material supply apparatus for supplying the material, and a spray applicator fluidly coupled to the supply apparatus for spraying the material in the spray pattern. A masking tool assembly is coupled to the spray applicator and includes first and second skive manifolds having adjustable positions relative to the spray applicator for masking portions of the spray pattern of the material and collecting excess material during spraying by the spray applicator. A controller is provided for generating a first set of control signals. The system further includes a drive mechanism adapted to receive the first set of control signals to adjust the positions of the first and second skive manifolds to vary the form of the spray pattern.

The method and system of the invention provides numerous advantages. For example, the masking tool assembly improves process control and increases the efficiency of the application by recovering a majority of the over spray created in the process. The flexibility of the masking tool assembly provides a solution to coat underbodies that cannot be coated with a rotary mask tool. Also, the masking tool assembly is small compared to a rotary mask and can be used with smaller, less expensive robot manipulators.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
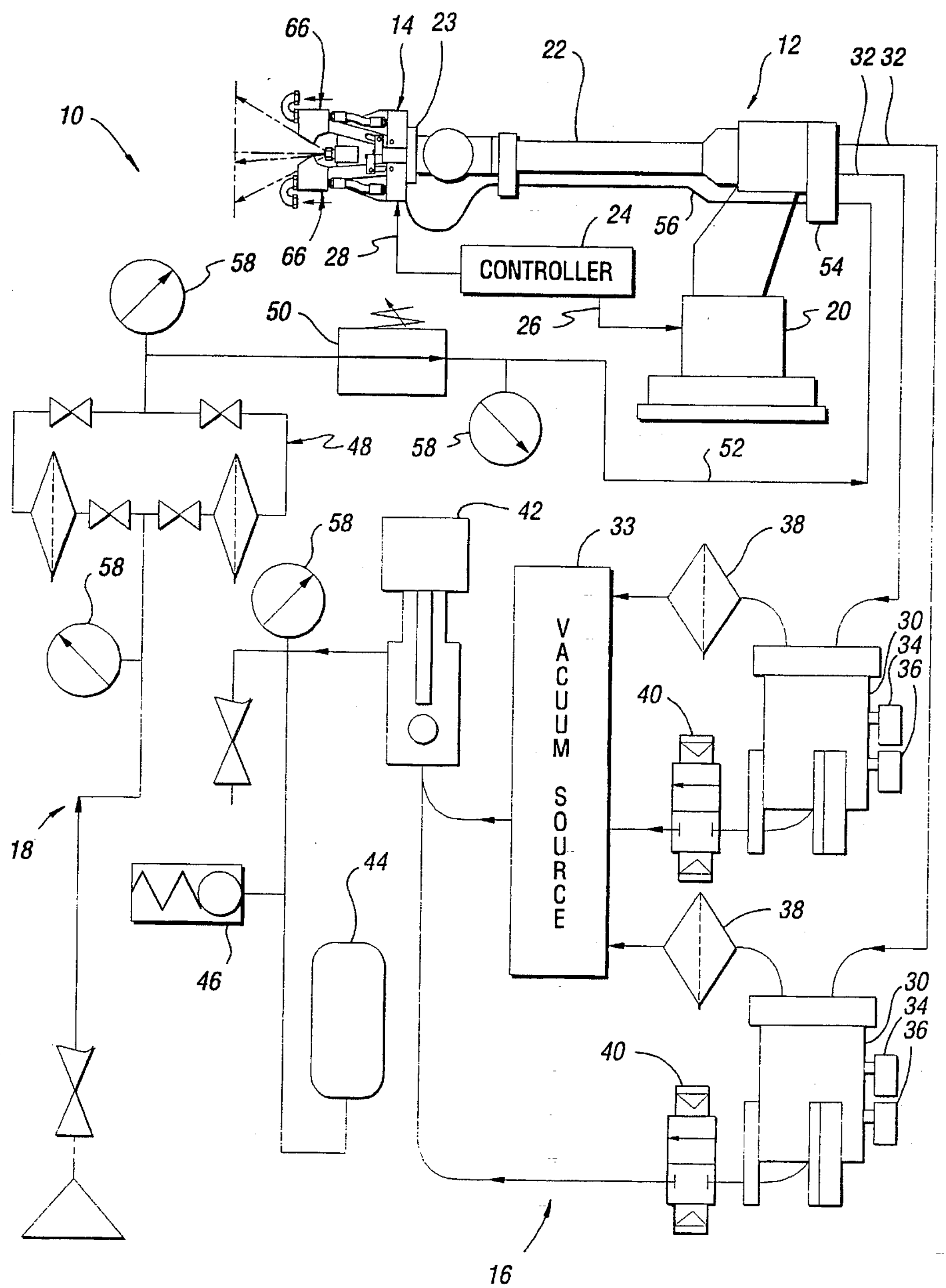
FIG. 1 is a schematic diagram illustrating a system of the present invention.

Referring now to the drawing figures, there is illustrated in FIG. 1 a variable width spray system, generally indicated at 10. The system 10 includes a robot manipulator, generally indicated at 12, a masking tool assembly, generally indicated at 14, sealer recovery hardware, generally indicated at 16, and sealer supply hardware, generally indicated at 18.

The robot manipulator 12 includes a base 20 on which there is mounted for movement a robot arm 22 on which the masking tool assembly 14 is mounted at a distal end thereof by means of a safety clutch 23.

A programmable robot controller 24 generates robot control signals along line 26 to control the motion of the robot manipulator 12. The robot controller 24 also provides at least one control signal along line 28 to control the masking tool assembly 14 or a second embodiment of a masking tool assembly 14' as discussed in greater detail hereinbelow.

The sealer recovery hardware 16 includes a pair of recovery tanks 30 for storing sealer recovered along lines 32 which extend between the recovery tanks 30 and the robot arm 22. A vacuum source 33 is fluidly coupled to the masking tool assembly 14 through the recovery tanks 30 and the lines 32 to suck the sealer through the lines 32 and into the recovery tanks 30.

The amount of sealer contained in the recovery tanks are sensed by high level sensors 34 and low level sensors 36.

Filters 38 are provided for filtering the air in the upper portion of the recovery tanks 30 as it flows to the vacuum source 33. A material valve 40 is provided between each of the recovery tanks 30 and a recovery pump 42 which pumps material from the recovery tanks 30, through the material valves 40 and into an accumulator 44 of the sealer supply hardware 18.

The sealer supply hardware 18 also includes a check valve 46 through which the material accumulated in the accumulator 44 flows to a filter stand, generally indicated at 48. The filter stand 48 filters the sealer material as the sealer material travels to a spray pressure regulator 50 along sealer supply line 52 to a manifold 54 through which the supplied sealer material flows to the masking tool assembly 14 and through which the recovered sealer material flows back to the sealer recovery hardware 16.

From the manifold 54, the sealer material flows through a hose 56 to the masking tool assembly 14.

A number of pressure gauges 58 are located throughout the sealer supply hardware to provide an indication of the pressure of the sealer material therein.

Figure 2:
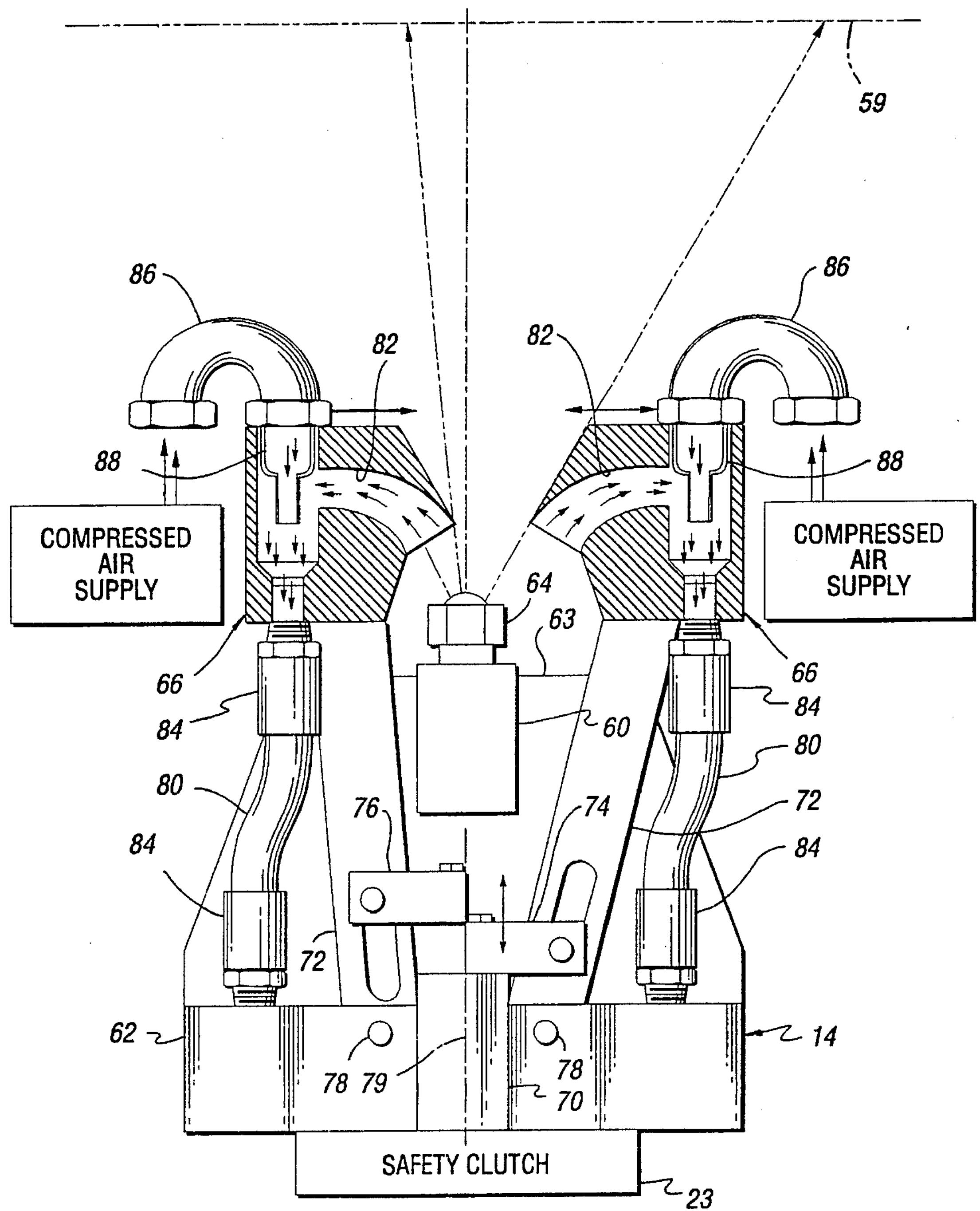
FIG. 2 is a schematic diagram of an assembly, partially in cross-section, having single servo-cylinder control for symmetrical spray width control, for use in the system of FIG. 1.
Figure 3:
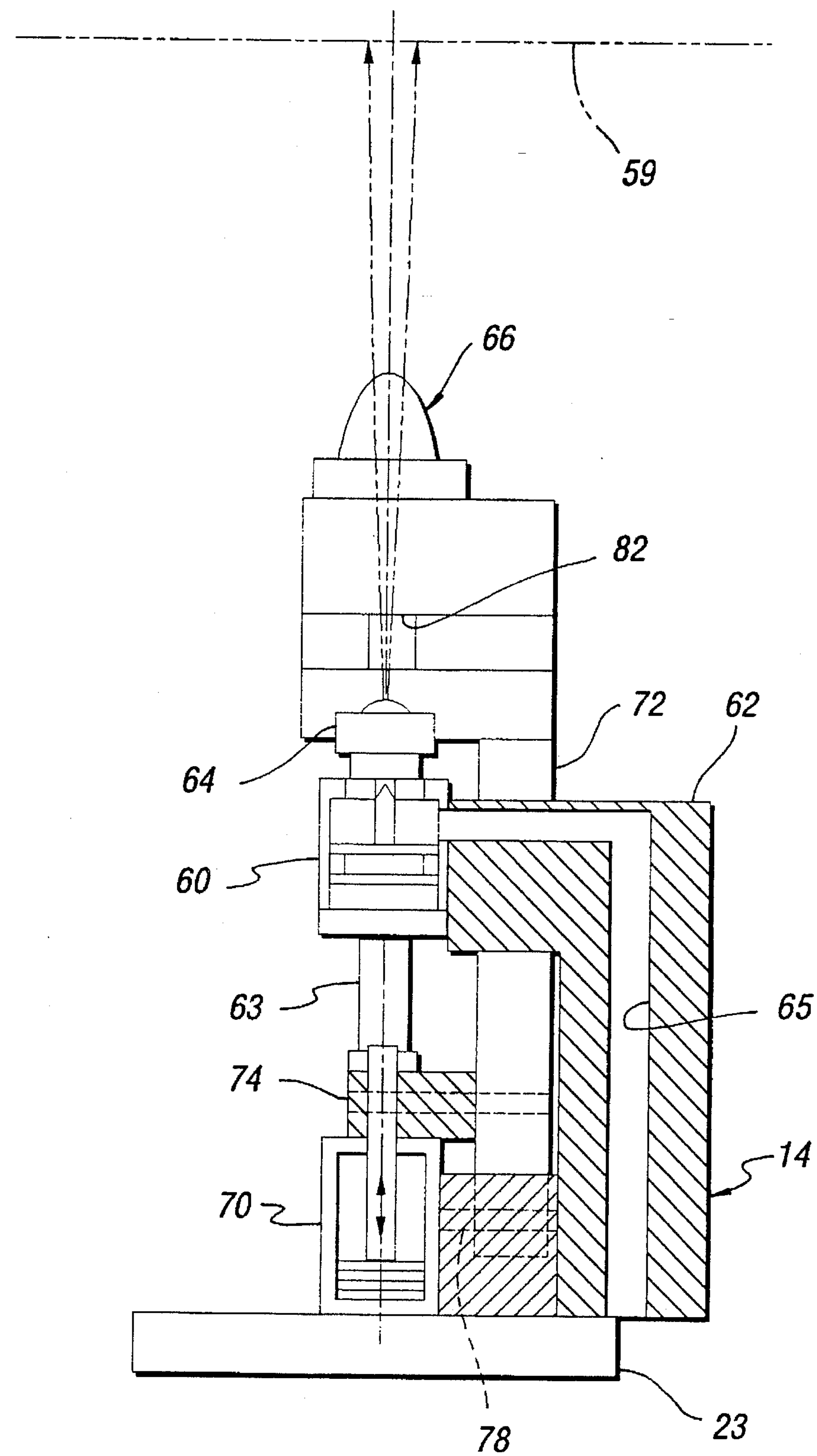
FIG. 3 is a schematic diagram of a single servo-cylinder, partially in cross-section, for symmetrical spray width applications and for use in the assembly of FIG. 2.

Referring now to FIGS. 2 and 3, the system 10 functions by spraying material on a workpiece, indicated in phantom at 59, such as a vehicle body using a conventional airless spray applicator or gun 60. The gun 60 is mounted on a supply and recovery material manifold 62 by a bracket 63 of the tool assembly 14. The manifold 62 supplies the material to the spray gun 60 through a passage 65. A spray tip 64 controls the spray pattern and an air line (not shown) controls operation of the gun 60.

The spray pattern width is controlled by collecting overspray using adjustable skive manifolds, generally indicated at 66, on each side of the fan spray pattern. The positions of the skive manifolds 66 are programmable by using a single pneumatic servo valve (not shown) responsive to a control signal on line 28 to control the position of a single fan width adjustment cylinder 70. The cylinder 70 moves a linkage assembly 72 to change the position of the skive manifolds 66 from a wide pattern position, as indicated at 74, to a narrow pattern position, as indicated at 76. The linkage assembly 72 rotates the manifold 62 about axes, indicated by pins 78. The half of FIG. 2 to the left of center line 79 shows an extended position of the cylinder 70 for the narrow pattern position 76, and the half of FIG. 2 to the right of the center line 79 shows a retracted position of the cylinder 70 for the wide pattern position 74.

The cylinder 70 may be replaced by other conventional linear servo actuators such as a motor-screw combination.

Figure 4:
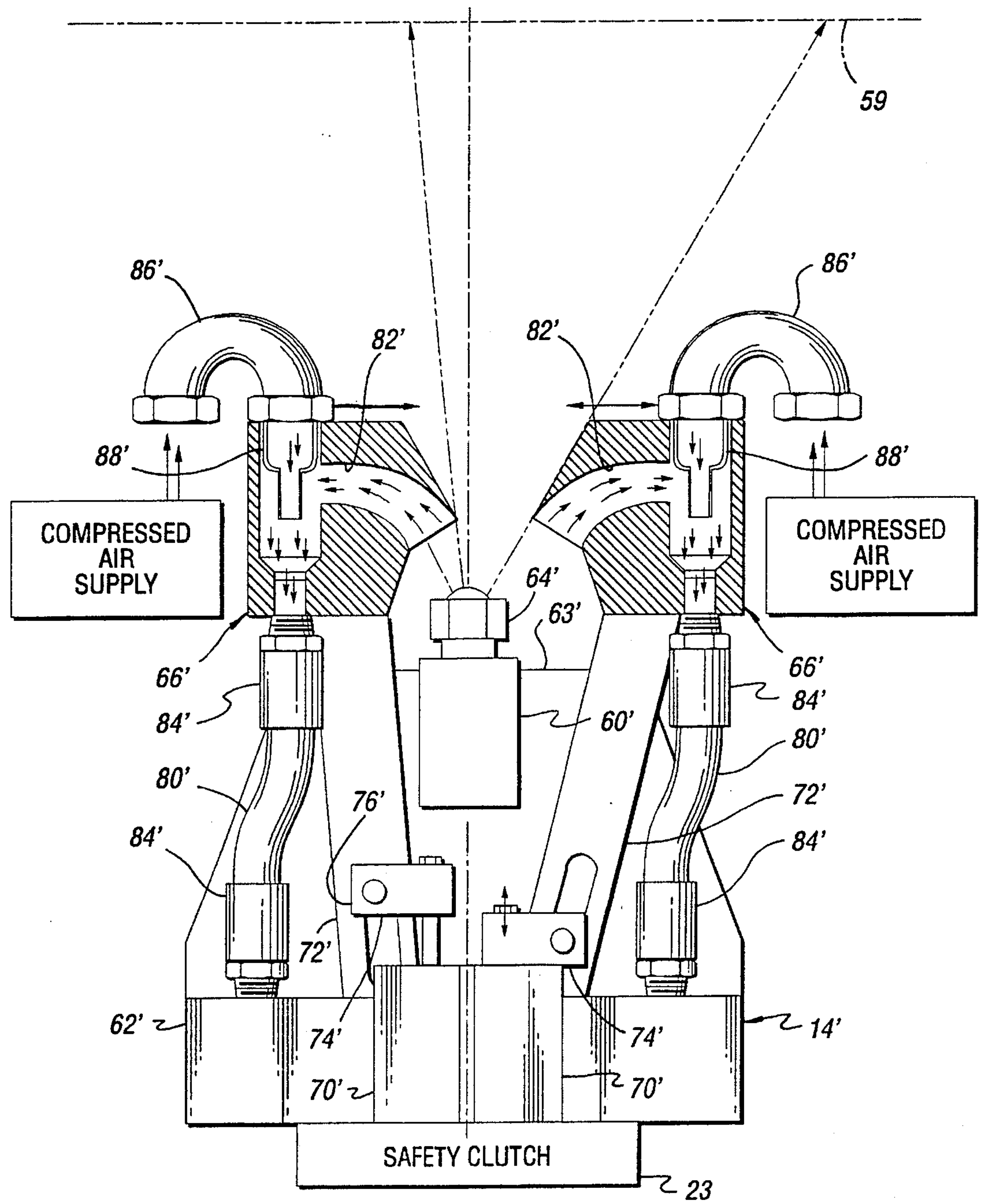
FIG. 4 is a schematic diagram of an assembly, partially in cross-section, having dual servo-cylinder control for spray width control.
Figure 5:
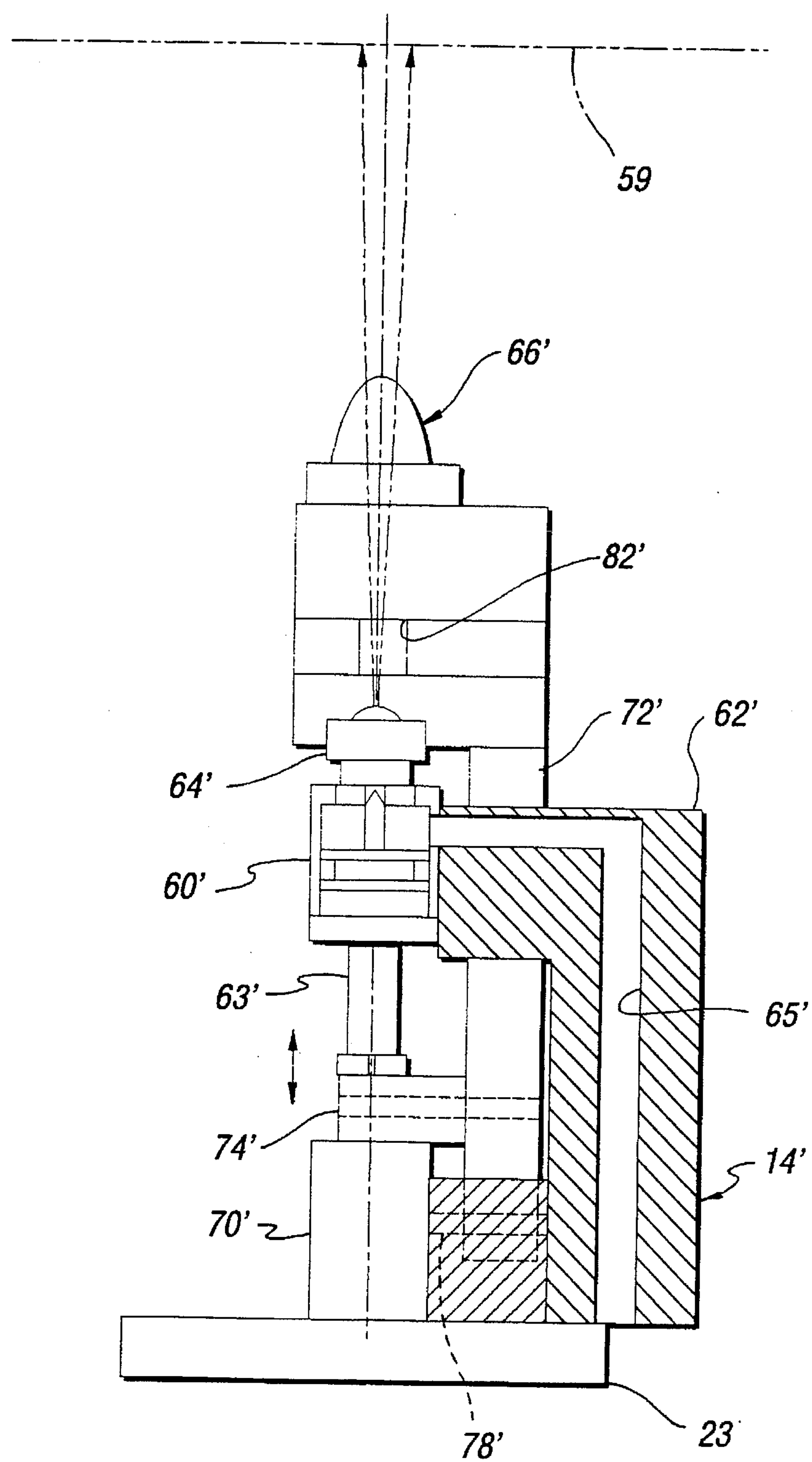
FIG. 5 is a schematic diagram of a dual servo-cylinder for spray width control and for use in the assembly of FIG. 4.

The cylinder 70 acts in tandem on both links 72, as illustrated in FIGS. 2 and 3. In the embodiment of FIGS. 4 and 5, two adjacent cylinders 70', each of which acts independently on one of the two links 72', position the links 72' to desired positions.

In the embodiment of FIGS. 4 and 5, parts which are the same or similar in structure or function to the parts of FIGS. 2 and 3 have the same reference numeral but a single prime designation.

Rotary actuators, such as conventional electric, hydraulic, or pneumatic motors, may also be used to rotate the two links 72 around the hinge pins 78. With the two actuators of the second embodiment, the positions of the two links 72' are controlled independently to obtain non-symmetrical fan patterns. The controller 24 then provides two independent and programmable control signals for independently controlling the positions of the two links 72'.

In another embodiment of the invention, the spray applicator is provided with a plurality of skive manifolds, such as 66. Each skive manifold 66 is controlled by independent actuators to obstruct the path of the spray material independently at selected locations around the sprayed material and define a desired spray pattern. For example, four skive manifolds may define a rectangular spray pattern of varying proportions. The skive manifolds 66 may also be profiled to generate profiled spray pattern edges, especially desirable for many stationary spray applications.

In this way, the positions of the manifolds 66 are programmable and adjusted by the robot program in the robot controller 24 as required for proper application during the spray process. The two extreme positions are shown in FIG. 2 on opposite sides of the spray pattern.

As the edges of the airless spray pattern are contained by the skive manifolds 66, the resulting spray pattern width is controlled dimensionally at the point of application. The overspray material is collected in the skive manifolds 66 which are venturi-type manifolds. The overspray material is then evacuated through the manifolds 66, hoses 80, the manifold 62, couplers 84 which interconnect the hoses 80 to the manifolds 62 and 66, and lines 32 to the recovery tanks 30.

The velocity of the material being sprayed is used to collect the material, in chambers 82 formed in the skive manifolds 66 on either edge of the spray pattern. This masking method uses skive edges of the manifolds 66 to split the airless spray pattern forcing excess material into the venturi-type chambers 82, collecting the material for removal by the vacuum operated recovery system 16. The recovered material is then preferably reused.

For example, the recovered material is pumped into the accumulator 44 and thoroughly mixed, either naturally or with a separate mixer, with virgin sealer material. Experience has shown that the recovered material usually looses appreciable amounts of solvents and reduces the spray quality if sprayed directly back on the workpiece. Accordingly, the recovered material is advisably mixed with fresh, unused material. The proportion of the mixing varies with the type of material and can reach up to 30% recovered to 70% fresh material. Since the amount of recovered material is usually much less than 30% of the total material sprayed, almost all of the recovered material can be reused, and appreciable savings are realized from this process.

The masking tool assembly 14 is programmable to vary the resulting fan pattern width. The assembly 14 may use gravity for collecting the material for evacuation. The assembly 14 is compact and can additionally be used for application of underbody coatings. This concept provides the amount of masking required for the spray sealing process. The assembly 14 also provides consistent edge definition of the airless spray patterns on both edges of the pattern to a quality level equivalent to masking by taping materials.

Referring now to FIGS. 2 and 4, there is illustrated apparatus for recovering excess sprayed material. High pressure air from a compressed air supply is injected through a fitting 86 or 86' into a venturi nozzle 88 or 88' at high speed to generate a vacuum at the venturi throat to suck in the excess material. The expanded section after the throat partially recovers the compressed air energy and allows the air to drive the excess material into the recovery lines for flow to the recovery tanks.

Operation

The system of FIG. 1 operates by spraying materials on surfaces using the airless spray applicator 60. The sealer supply hardware 18 provides the material at the proper spray pressure and volume to meet application speed of the robot manipulator 12. The spray pattern width is controlled, with the masking tool assembly 14, by skiving off the edges of the spray pattern. The overspray material is recovered for reuse by the sealer recovery hardware 18. The recovered material is removed from the recovery tanks 30 as required, by the recovery pump 42. Low and high level indicators or sensors 36 and 34, respectively, in the recovery tanks 30 control the operation of the recovery pump 42. The material is filtered by filters of the filter stand 48 prior to being reused. The spray pressure is controlled by the material pressure regulator 50 in the supply line 52 to the airless spray gun 60. Material recovery lines 32 and material supply lines 52 which extend from the masking tool assembly 14 to the recovery and supply hardware 16 and 18, respectively, are routed through the manifolds 62 and 54 with hosing as required for the application.

While the best mode for carrying out the invention has been described in detail, those familiar with the art to which this invention relates will recognize various alternative designs and embodiments for practicing the invention as defined by the following claims.

What is claimed is:

1. A system for spraying material in a spray pattern having a variable form and collecting excess material, the system comprising:

material supply apparatus for supplying spraying material;

a spray applicator fluidly coupled to the supply apparatus for spraying the material in a spray pattern;

a masking tool assembly coupled to the spray applicator and including first and second skive manifolds constructed to be adjustably positioned relative to the spray applicator for masking portions of the spray pattern of the material and collecting excess material during spraying by the spray applicator;

a controller for generating a first set of control signals;

a drive mechanism coupled to the controller and constructed and arranged to receive said first set of control signals to adjust the positions of the first and second skive manifolds to vary the form of the spray pattern; and material recovery apparatus fluidly connected to the material supply apparatus for returning material collected by the pair of skive manifolds to the material supply apparatus, the material recovery apparatus including a compressed air venturi nozzle fluidly connected to the skive manifolds for evacuating and subsequently driving the excess material into the material supply apparatus such that the excess material may be reused.

2. The system as claimed in claim 1 wherein the first skive manifold is located at a first side of the spray pattern and the second skive manifold is located at a second side of the spray pattern substantially opposite the first side.

3. The system of claim 1 wherein the material recovery apparatus includes at least one material recovery tank and a vacuum source fluidly coupled to the pair of skive manifolds constructed and arranged for sucking the excess material from the pair of skive manifolds and depositing the excess material in the at least one material recovery tank.

4. The system of claim 3 wherein the material recovery apparatus includes a recovery pump fluidly connected to the material supply apparatus and at least one sensor for sensing the amount of material in the at least one material recovery tank and for generating a sense signal in response thereto, the recovery pump being responsive to the sense signal to pump the material from the at least one recovery tank to the material supply apparatus.

5. The system as claimed in claim 1 wherein the drive mechanism is a servo controlled linear actuator connected to the first and second skive manifolds and wherein the linear actuator is constructed and arranged to receive the first set of control signals to control the position of the linear actuator.

6. The system as claimed in claim 5 further comprising a linkage assembly connected to the linear actuator for transmitting motion of the linear actuator to the first and second skive manifolds to adjust the positions of the first and second skive manifolds.

7. The system as claimed in claim 1 wherein the drive mechanism includes first and second servo controlled actuators connected to the first and second skive manifolds, respectively, to control the positions of the first and second skive manifolds, respectively.

8. The system as claimed in claim 1 further comprising a manipulator wherein the spray applicator is mounted on the manipulator, and wherein the manipulator is responsive to manipulator control signals generated by the controller.

9. A system for spraying material in a spray pattern having a variable form and collecting excess material, the system comprising:

material supply apparatus for supplying spraying material;

a spray applicator fluidly coupled to the supply apparatus for spraying the material in a spray pattern;

a masking tool assembly coupled to the spray applicator and including first and second skive manifolds constructed to be adjustably positioned relative to the spray applicator for masking portions of the spray pattern of the material and collecting excess material during spraying by the spray applicator;

a controller for generating a first set of control signals; and a drive mechanism coupled to the controller and constructed and arranged to receive said first set of control signals to adjust the positions of the first and second skive manifolds to vary the form of the spray pattern, the drive mechanism including first and second servo controlled actuators connected to the first and second skive manifolds, respectively, to control the positions of the first and second skive manifolds, respectively.

10. The system as claimed in claim 9 wherein the first skive manifold is located at a first side of the spray pattern and the second skive manifold is located at a second side of the spray pattern substantially opposite the first side.

11. The system as claimed in claim 9 further comprising material recovery apparatus fluidly connected to the material supply apparatus for returning material collected by the pair of skive manifolds to the material supply apparatus.

12. The system as claimed in claim 9 wherein each of the first and second servo controlled actuators is a servo controlled linear actuator and wherein each of the linear actuators is constructed and arranged to receive the first set of control signals to control the positions of each of the linear actuators.

13. The system as claimed in claim 9 further comprising a manipulator wherein the spray applicator is mounted on the manipulator, and wherein the manipulator is responsive to manipulator control signals generated by the controller.

14. A system for spraying material in a spray pattern having a variable form and collecting excess material, the system comprising:

material supply apparatus for supplying spraying material;

a spray applicator fluidly coupled to the supply apparatus for spraying the material in a spray pattern;

a masking tool assembly coupled to the spray applicator and including first and second skive manifolds constructed to be adjustably positioned relative to the spray applicator for masking portions of the spray pattern of the material and collecting excess material during spraying by the spray applicator;

a controller for generating a first set of control signals;

a drive mechanism coupled to the controller and constructed and arranged to receive said first set of control signals to adjust the positions of the first and second skive manifolds to vary the form of the spray pattern, the drive mechanism being a servo controlled linear actuator connected to the first and second skive manifolds and wherein the linear actuator is constructed and arranged to receive the first set of control signals to control the position of the linear actuator; and a linkage assembly connected to the linear actuator for transmitting motion of the linear actuator to the first and second skive manifolds to adjust the positions of the first and second skive manifolds.

15. The system as claimed in claim 14 wherein the first skive manifold is located at a first side of the spray pattern and the second skive manifold is located at a second side of the spray pattern substantially opposite the first side.

16. The system as claimed in claim 14 further comprising material recovery apparatus fluidly connected to the material supply apparatus for returning material collected by the pair of skive manifolds to the material supply apparatus.

17. The system as claimed in claim 14 wherein the drive mechanism includes first and second servo controlled actuators connected to the first and second skive manifolds, respectively, to control the positions of the first and second skive manifolds, respectively.

18. The system as claimed in claim 14, further comprising a manipulator wherein the spray applicator is mounted on the manipulator, and wherein the manipulator is responsive to manipulator control signals generated by the controller.

* * * * *